United States Patent
Carr et al.

(10) Patent No.: US 6,333,935 B1
(45) Date of Patent: Dec. 25, 2001

(54) STATE MACHINE ARCHITECTURE WITH MULTIPLEXED RANDOM ACCESS MEMORY

(75) Inventors: Larrie Simon Carr, Burnaby; Winston Ki-Cheong Mok, Vancouver, both of (CA)

(73) Assignee: PMC-Sierra Ltd., Vancouver (CA)

(*) Notice: Subject to any disclaimer, the term of this patent is extended or adjusted under 35 U.S.C. 154(b) by 0 days.

(21) Appl. No.: 09/057,509

(22) Filed: Apr. 9, 1998

(51) Int. Cl.[7] .............................. H04B 7/212; H04J 3/07
(52) U.S. Cl. ........................................... 370/442; 370/443
(58) Field of Search ..................... 370/337, 347, 370/442, 443, 506, 508, 528, 537, 540, 541

(56) References Cited

U.S. PATENT DOCUMENTS

| | | | | |
|---|---|---|---|---|
| 4,298,959 | * | 11/1981 | Sundermeyer et al. | 364/900 |
| 4,602,275 | * | 7/1986 | Smith et al. | 358/111 |
| 5,361,097 | * | 11/1994 | Kolczynski | 348/390 |
| 5,521,928 | * | 5/1996 | Worsley et al. | 370/67 |
| 5,640,398 | * | 6/1997 | Carr et al. | 370/376 |

* cited by examiner

Primary Examiner—Dang Ton
Assistant Examiner—Toan Nguyen
(74) Attorney, Agent, or Firm—Oyen Wiggs Green & Mutala

(57) ABSTRACT

A plurality of time-division multiplexed data streams which are merged into a single data stream containing a plurality of data words and which are characterized by state vectors, are concurrently processed. The state vectors are stored in a read-write memory having a plurality of addressable memory locations. During an initial clock cycle, a pipeline receives an input data word from one of the data streams, an input state vector characterizing that data stream, and the memory location address of the input state vector. During one or more intermediate clock cycles, the pipeline processes the input data word and the input state vector to yield an output data word and an output state vector. During a final clock cycle, the pipeline transfers the output data word to an outgoing data stream, and transfers the output state vector into the aforementioned memory location address. A controller coupled to the memory and to the pipeline synchronizes operation thereof. A null cycle generator coupled to the pipeline and to the controller inserts null cycles into the concurrently processed data streams at regular time intervals and outputs a NULL signal to the controller during each null cycle. A multiplexer coupled between the controller and the memory multiplexes access to the memory between the controller/pipeline, and an alternate controller. Read access to the memory by the controller or pipeline is inhibited while the NULL signal is output, and write access to the memory by the pipeline is inhibited while an OUTGOING NULL replica of the NULL signal is being output by the pipeline during the final clock cycle. Accordingly, the alternate controller may gain read access to the memory while the NULL signal is output, and may gain write access to the memory while the OUTGOING NULL signal is output.

11 Claims, 2 Drawing Sheets

STATE MACHINE ARCHITECTURE WITH MULTIPLEXED RANDOM ACCESS MEMORY

TECHNICAL FIELD

This invention is directed to an improved pipelined, time-sliced state machine architecture for processing time-division multiplexed data streams in a manner which facilitates concurrent access to state vectors stored in a random access memory ("RAM") by state machine logic and by separate controller circuitry.

BACKGROUND

U.S. Pat. No. 5,640,398 "State Machine Architecture for Concurrent Processing of Multiplexed Data Streams" (hereafter "the '398 patent") describes the architecture shown in FIG. 1, in which a pipelined state machine coupled to a state vector stored in a random access memory ("RAM") enables concurrent processing of a number of data channels. The '398 patent makes no mention of how data in RAM 12 is to be initialised at system start up, or updated by a control processor. Typically, the RAM entry pertaining to a particular channel includes data such as option selection codes which determine how the state machine is to process that channel's data stream. Such data may need to be updated or observed by a control processor from time to time.

A simple method of providing control processor access to RAM 12 is to provide an additional data port on RAM 12. For example, if the state machine uses separate read and write ports to access RAM 12, then a triple-port RAM may be used instead of a dual-port RAM, with the third port being reserved for control processor access. However, this method suffers from the disadvantage that multi-port memories are more complex and expensive due to the requirement to replicate address decode circuitry and re-design the memory bit cells.

A second method is to multiplex access to RAM 12's write port between the state machine and the control processor. When the control processor wishes to update the RAM entry corresponding to a particular channel, a multiplexer examines the stream of write addresses being generated by state machine pipeline 18 and, when the required address is present at RAM 12's write port, substitutes the data supplied by the control processor for the state machine's write data. However, this method is feasible only if Timing Generator and Control block 10 is able to generate all possible RAM addresses within a reasonable time, so that the multiplexer is not forced to wait indefinitely for an address match. In certain systems (for example, if channels are permitted to have widely differing data rates, or if channels may be disabled for extended periods), it may not be possible to satisfy this condition. The '398 patent describes the operation of the state machine in a SONET application in which Timing Generator and Control block 10 tracks SONET time slots and cycles through all RAM addresses periodically, thereby satisfying the foregoing condition.

The present invention improves upon the architecture of the '398 patent in a manner which facilitates timely control processor or other hardware access to RAM 12 without requiring an additional RAM port; and, which can be used in situations in which Timing Generator and Control block 10 is unable to generate every RAM address within a predeterminable time frame. The invention also facilitates control processor access to any state machine RAM location, even if that location is not within the address space of Timing Generator and Control block 10. In prior art SONET applications, state machine RAMs are indexed by SONET time slot, with Timing Generator and Control block 10 cycling through all RAM addresses. However, in Internet PPP applications in which data is transported in HDLC format over channelised T1 or E1 links, state machine RAMs are indexed by HDLC channel, and it is possible for a single channel to be mapped to one or more time slots of a TDM link. Accordingly, in a HDLC application, it may be necessary to initialise a channel's RAM entry before that entry is mapped to a time slot. If a channel is unmapped, Timing Generator and Control block 10 will not generate the RAM address for that channel's entry, if configured in accordance with the '398 patent.

SUMMARY OF INVENTION

The invention facilitates concurrent processing of a plurality of time-division multiplexed data streams which are merged into a single data stream containing a plurality of data words and which are characterized by state vectors. The state vectors are stored in a read-write memory having a plurality of addressable memory locations. During an initial clock cycle, a pipeline receives an input data word from one of the data streams, an input state vector characterizing that data stream, and the memory location address of the input state vector. During one or more intermediate clock cycles, the pipeline processes the input data word and the input state vector to yield an output data word and an output state vector. During a final clock cycle, the pipeline transfers the output data word to an outgoing data stream, and transfers the output state vector into the aforementioned memory location address. A controller coupled to the memory and to the pipeline synchronizes operation thereof. A null cycle generator coupled to the pipeline and to the controller inserts null cycles into the concurrently processed data streams at regular time intervals and outputs a NULL signal to the controller during each null cycle. A multiplexer coupled between the controller and the memory multiplexes access to the memory between the controller/pipeline, and an alternate controller. Read access to the memory by the controller or pipeline is inhibited while the NULL signal is output, and write access to the memory by the pipeline is inhibited while an OUTGOING NULL replica of the NULL signal is being output by the pipeline during the final clock cycle. Accordingly, the alternate controller may gain read access to the memory while the NULL signal is output, and may gain write access to the memory while the OUTGOING NULL signal is output.

DESCRIPTION

Figure 1:
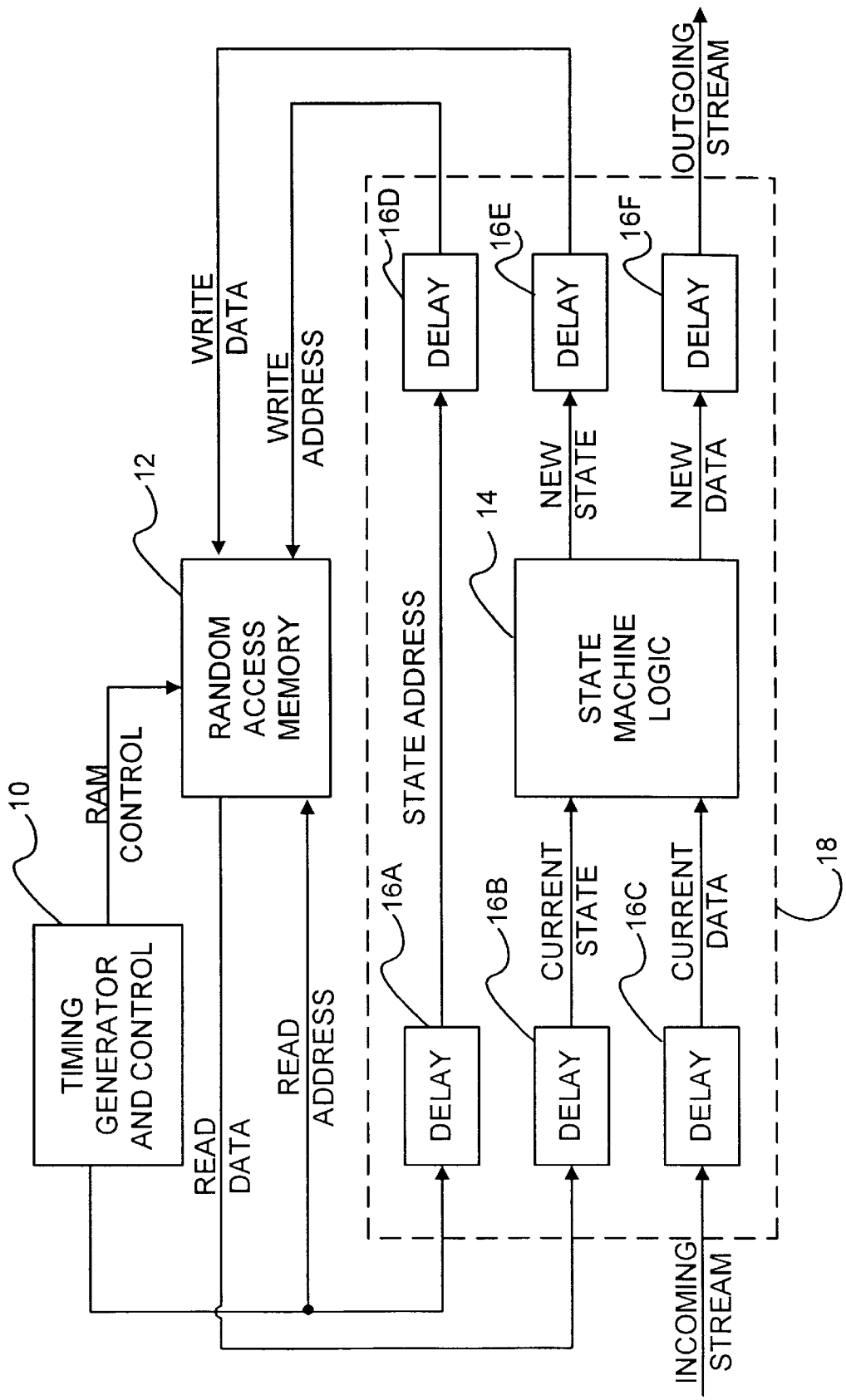
FIG. 1 is a block diagram depiction of a prior art state machine architecture for concurrent processing of multiplexed data streams in accordance with the '398 patent.
Figure 2:
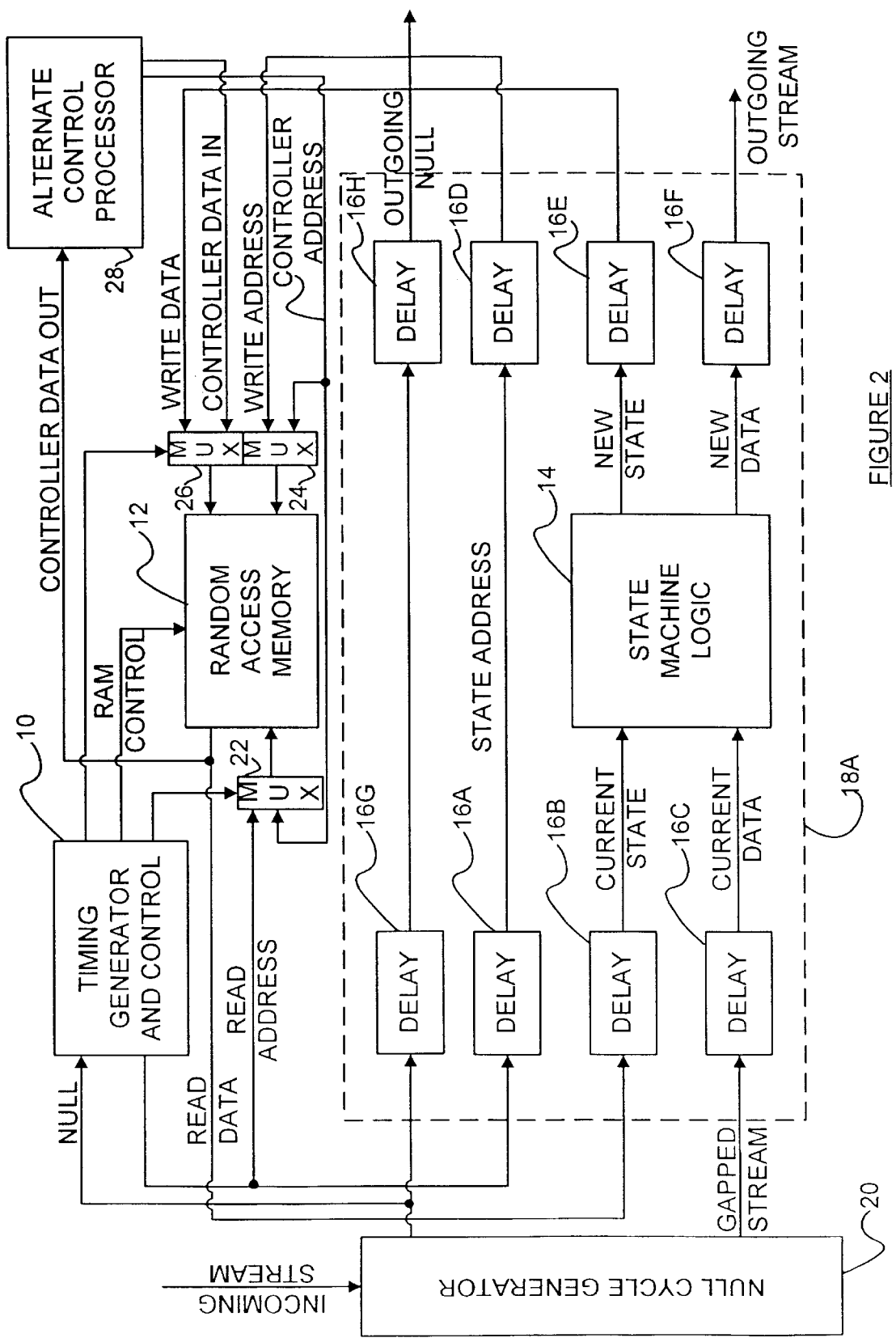
FIG. 2 is a block diagram depiction of a state machine architecture for concurrent processing of multiplexed data streams in accordance with the present invention. For ease of reference, components which are identical in both the FIG. 1 and FIG. 2 embodiments bear identical reference numerals.

FIG. 2 illustrates a multi-channel state machine in accordance with the invention. As in the case of the '398 patent, Timing Generator and Control block 10 identifies each time-slice of the incoming multiplexed data stream and controls RAM 12. State vectors which characterize the information modules being processed in the incoming multiplexed data stream are stored in unique read-write memory locations having known addresses within RAM 12. A "logic means", namely State Machine Logic block 14 contains combinational logic which implements the desired state transitions and data stream manipulations. Delay blocks 16A–16F may be flip/flops or latch type delay elements configured to form a data pipeline having a length of one clock cycle.

Unlike the '398 patent architecture, the present invention incorporates Null Cycle Generator 20, Delay blocks 16G–16H and RAM port multiplexers ("MUX") 22, 24, 26. Null Cycle Generator 20 pre-processes the incoming stream by introducing "null cycle" gaps into the stream at regular intervals to yield a "gapped stream" which is input to Delay block 16C. Null Cycle Generator 20 also outputs a "NULL" signal, which remains active during each null cycle to indicate that no data is present on the incoming stream. The NULL signal is passed to Timing Generator and Control block 10 for use in controlling multiplexing of the state machine RAM address and data signals, as hereinafter explained. The NULL signal is also passed through Delay blocks 16G–16H incorporated in state machine pipeline 18A, and is output (as an "OUTGOING NULL" signal), along with the outgoing data stream, for use as a "data valid" indicator or as a null cycle indicator by a further, downstream multi-channel pipelined state machine (not shown). The OUTGOING NULL signal output by Delay block 16H is also fed back to Timing Generator and Control block 10 for use in controlling multiplexers 22, 24, 26 as hereinafter explained.

In operation, Timing Generator and Control block 10 is synhronized to the ordering of the time-slices in the incoming data stream by the NULL signals output by Null Cycle Generator 20. When the NULL signal becomes inactive, indicating arrival of a word of data of an information module in the incoming multiplexed data stream, Timing Generator and Control block 10 prefetches the state vector for that time-slice from RAM 12 by supplying the appropriate RAM address location via multiplexer 22. The state vector, the RAM address used to retrieve the state vector, and the data word are then inserted into pipeline 18A. More particularly, during the first (or initial) clock cycle, the state vector retrieved from RAM 12 is fed into Delay block 16B, the RAM address from which that state vector was retrieved is fed into Delay block 16A, the data word is fed into Delay block 16C, and the NULL signal (which is inactive, indicating data presence on the incoming stream) is fed into Delay block 16G.

State Machine Logic block 14 performs the desired state transitions and data manipulations on the time-slice information during the next (i.e. second, or intermediate) clock cycle. This yields a new state vector which is output from State Machine Logic block 14 and fed into Delay block 16E during the second clock cycle; and, a new data word which is output into Delay block 16F (also during the second clock cycle). The new data word may or may not be identical to the input data word, depending upon the manipulations dictated by the state vector. While State Machine Logic block 14 processes the state vector and data word, Timing Generator and Control block 12 prefetches the state vector for the next time-slice.

During the next (i.e. third, or final) clock cycle, the new state vector output by State Machine Logic block 14 is written from Delay block 16E back into the RAM 12 location addressed by Delay block 16D, via multiplexers 24, 26 respectively. Due to the pipeline nature of the design, the RAM address for the time-slice must be carried with the state vector to ensure that the new state vector is written back into the correct RAM location. Thus, the RAM address from which the original state vector was retrieved is fed from Delay block 16A to Delay block 16D, and is then used to perform the write back of the new state vector into RAM 12. If a given time-slice of the incoming data stream is to be ignored (i.e. if the NULL signal output by Null Cycle Generator 20 is active), then Timing Generator and Control block 10 inhibits write back into RAM 12 for that time-slice, effectively deeming pipeline 18A to contain non-information.

Multiplexers 22, 24 and 26 also facilitate access to RAM 12 by an alternate control processor 28. Specifically, by applying an appropriate RAM address location to the Read Address port of RAM 12 via the "Controller Address" line and multiplexer 22, alternate controller 28 may read the contents of that location via the "Controller Data Out" line. Similarly, by applying an appropriate RAM address location to the Write Address port of RAM 12 via the "Controller Address" line and multiplexer 24, and by applying a data word to the Write Data port of RAM 12 via the "Controller Data In" line and multiplexer 26, alternate controller 28 may store that data word in that location. Note that alternate controller 28 is granted read access to RAM 12 (by the switching operation of multiplexer 22) only during cycles in which the NULL signal is active; and, control processor 28 is granted write access to RAM 12 (by the switching operation of multiplexers 24 and 26) only during cycles in which the OUTGOING NULL signal is active; whereas Timing Generator and Control block 10 and pipeline 18 are granted read access to RAM 12 only during cycles in which the NULL signal is inactive, and are granted write access to RAM 12 only during cycles in which the OUTGOING NULL signal is inactive. It can thus be seen that the invention facilitates shared, non-interfering access to RAM 12 by two different controllers (i.e. Timing Generator and Control block 10 and pipeline 18 together being a "first" controller, and alternate control processor 28 being a "second controller").

As with the '398 patent, a single port type RAM may be used instead of a dual port type RAM if multiple RAM accesses can be performed during each clock cycle. For example, a RAM write-read cycle could be performed for each incoming time-slice, effectively duplicating the function of a dual port type RAM. By writing the new state vector to the RAM before reading the current state vector, a write-through mechanism would be implemented. A longer pipeline may also be provided. Thus, if State Machine Logic block 14 can not generate the new state vector and/or new data word in one clock period, the entire pipeline could be lengthened to distribute the processing over multiple clock cycles (i.e. processing may occur during one or more of the second or intermediate clock cycles).

As will be apparent to those skilled in the art in the light of the foregoing disclosure, many alterations and modifications are possible in the practice of this invention without departing from the spirit or scope thereof. For example, if a dual port RAM which allows each port to function as either a read or a write port is used, then only a single "controller address" (i.e. either a read address or a write address) need be multiplexed to one of the RAM ports; and, only a single "controller data out" signal (i.e. a write data signal) or a single "controller data in" signal (i.e. a read data signal) need be read from the other RAM port. (Although FIG. 2 shows a dual port RAM 12, that RAM is configured with one port dedicated to write operations only and the other port dedicated to read operations only). Accordingly, the scope of the invention is to be construed in accordance with the substance defined by the following claims.

What is claimed is:

1. Apparatus for concurrently processing a plurality of time-division multiplexed data streams merged into a single data stream containing a plurality of data words and characterized by state vectors, said apparatus comprising:
   (a) read-write memory means having a plurality of addressable memory locations for storing said state vectors;
   (b) a pipeline for:
      (i) during an initial clock cycle:
         (1) receiving an input data word from one of said data streams;
         (2) receiving, from a predefined memory location address in said memory means, an input state vector characterizing said one data stream;
         (3) receiving said predefined memory location address of said input state vector;
      (ii) during one or more intermediate clock cycles, processing said input data word and said input state vector to yield an output data word and an output state vector;
      (iii) during a final clock cycle:
         (1) transferring said output data word to an outgoing data stream;
         (2) transferring said output state vector to said predefined memory location address in said memory means;
   (c) control means coupled to said memory means and to said pipeline for synchronizing operation thereof;
   (d) a null cycle generator coupled to said pipeline and to said control means, said null cycle generator for inserting null cycles into said concurrently processed data streams at regular time intervals and for outputting a NULL signal to said control means during each of said null cycles; and,
   (e) multiplexer means coupled between said control means and said read-write memory means for multiplexing access to said read-write memory means between:
      (i) said control means and said pipeline; and,
      (ii) an alternate control means;
wherein said control means inhibits read access to said read-write memory means by said control means and by said pipeline during output of said NULL signal and inhibits write access to said read-write memory means by said pipeline during output of an OUTGOING NULL replica of said NULL signal by said pipeline during said final clock cycle, thereby enabling read access to said read-write memory means by said alternate control means during output of said NULL signal and enabling write access to said read-write memory means by said alternate control means during output of said OUTGOING NULL signal.

2. Apparatus as defined in claim 1, wherein said pipeline further comprises first delay means, second delay means, and state machine logic means, wherein:
   (a) said first delay means is for:
      (i) delayed storage and output to said state machine logic means of said input data word and said input state vector;
      (ii) delayed storage and output to said second delay means of said predefined memory location address;
      (iii) delayed storage and output to said second delay means of said NULL signal;
   (b) said state machine logic means performs said processing during said one or more intermediate clock cycles;
   (c) said second delay means is for:
      (i) delayed storage and output to said memory means of said output state vector and said predefined memory location address;
      (ii) delayed storage and output of said output data word; and,
      (iii) delayed storage of said NULL signal and output thereof to said control means as said OUTGOING NULL signal.

3. Apparatus as defined in claim 1, wherein:
   (a) said control means further comprises a clock having a selected clock cycle; and,
   (b) said pipeline has a delay characteristic equal to one of said clock cycles.

4. Apparatus as defined in claim 1, wherein said memory means is a random access memory.

5. Apparatus as defined in claim 1, wherein:
   (a) said control means further comprises a clock having a selected clock cycle; and,
   (b) said pipeline has a delay characteristic equal to a selected multiple of said clock cycles.

6. Apparatus as defined in claim 4, said random access memory further comprising a read address port, a write address port, a read data port and a write data port, said multiplexer means further comprising:
   (a) a first multiplexer for multiplexing access to said read address port between said control means and said alternate control means;
   (b) a second multiplexer for multiplexing access to said write address port between said pipeline and said alternate control means; and,
   (c) a third multiplexer for multiplexing access to said write data port between said pipeline and said alternate control means.

7. Apparatus as defined in claim 4, wherein said random access memory has a port configuration in which:
   (a) said read and write address ports are combined to form a single address port; and,
   (b) said read and write data ports are combined to form a single data port.

8. A method of concurrently processing a plurality of data streams time-division multiplexed into a single stream wherein state vectors characteristic of said single stream are stored in read-write memory locations having predefined addresses, said method comprising the steps of:

(a) inserting null cycles into said single stream at regular time intervals;

(b) outputting a NULL signal during each of said null cycles;

(c) pipeline processing said NULL signal through a plurality of clock cycles to output an OUTGOING NULL replica of said NULL signal;

(d) inhibiting read access to said read-write memory locations during said outputting of said NULL signal; and, (e) inhibiting write access to said read-write memory locations during said outputting of said OUTGOING NULL signal.

9. A method as defined in claim 8, further comprising multiplexing access to said read-write memory locations between first and second control means.

10. A method as defined in claim 9, wherein said multiplexing access step further comprises:

(a) multiplexing read access to said read-write memory locations between said first and second control means;

(b) multiplexing address write access to said read-write memory locations between said first and second control means; and, (c) multiplexing data write access to said read-write memory locations between said first and second control means.

11. A method as defined in claim 8, wherein said inhibiting steps further comprise inhibiting said read and write access to said read-write memory locations by a first controller to enable said read and write access to said read-write memory locations by a second controller.

* * * * *